United States Patent [19]

Piscaer

[11] Patent Number: 4,873,916

[45] Date of Patent: Oct. 17, 1989

[54] METHOD AND DEVICE FOR THE PREPARATION OF COFFEE

[75] Inventor: Petrus J. C. Piscaer, Rotterdam, Netherlands

[73] Assignee: De Erven De Weduwe J. Van Nelle B.V., Netherlands

[21] Appl. No.: 155,554

[22] Filed: Feb. 12, 1988

[30] Foreign Application Priority Data

Feb. 4, 1987 [NL] Netherlands .................. 8700455
Nov. 26, 1987 [NL] Netherlands .................. 8702837

[51] Int. Cl.$^4$ ............................................. A47J 31/00
[52] U.S. Cl. .................................... 99/289 R; 99/287
[58] Field of Search .................. 99/279, 289 R, 300, 99/297, 289 T, 289 D, 289 P, 287, 286; 426/433

[56] References Cited

U.S. PATENT DOCUMENTS

| | | | |
|---|---|---|---|
| 3,064,553 | 11/1962 | Simjian | 99/289 |
| 3,103,873 | 9/1963 | Breitenstein | 99/289 |
| 3,120,440 | 2/1964 | Ross | 99/289 |
| 3,300,094 | 1/1967 | Rockola | 99/279 |
| 3,369,478 | 2/1968 | Black | 99/297 |
| 3,662,675 | 5/1972 | Olland | 99/289 |

Primary Examiner—Robert W. Jenkins
Attorney, Agent, or Firm—John P. Snyder

[57] ABSTRACT

A cylindrical container has an open top, and the bottom is formed by a piston reciprocable in the container. A filter is laterally and vertically movable between an initial position to open the top of the container and a subsequent position to close the top of the container. Supply means above the container mixes ground coffee and hot water and includes one or more partitions to cause the mixture to flow vertically downward into the open top of the container with hardly any turbulence so that the ground coffee floats on the hot water. The filter is then moved to close off the top of the container, and the piston is moved upwardly to press the water through a layer of coffee disposed at the underside of the filter and thence through the filter to an outlet.

22 Claims, 6 Drawing Sheets

METHOD AND DEVICE FOR THE PREPARATION OF COFFEE

The present invention relates to a method for preparing coffee, whereby water and ground coffee are carried through the opened top of a container into the container, after which the container is closed off at the top by a filter and the water urged through the filter to the outside.

The present invention also relates to a device for the preparation of coffee, comprising:

a cylindrical container, the underside of which is formed by an upward movable piston;

a filter which can be arranged on the container, sealing the container at the top;

means for guiding ground coffee and water through the opened top of the container into the container.

Such method and device are known from the U.S. patent specification No. 3,103,873.

During the preparation of a cup of coffee with this known device, when the filter is moved away from the container, a quantity of ground coffee is first conveyed into the container via the opened top of the container. Then a quantity of hot water is carried into the container, also through the opened top of the container.

Only then does the ground coffee come into contact with the water.

When the two are combined, turbulences will occur so that, despite the fact that coffee has a smaller density than water, the ground coffee will not start floating on the water. When the piston is moved upward, the coffee will be distributed almost entirely over the volume of the water. As a result not all the ground coffee will come into contact with the water that is flowing past. Because a great portion of the ground coffee is in contact with the water for only a short period of time, the coffee obtained will be relatively weak and will not taste very good.

The present invention therefore has for its object to provide such a method and such a device whereby—using a given quantity of ground coffee—a cup of coffee of proper strength is prepared.

This aim is achieved by providing means for the supply of coffee and water substantially in vertical direction only.

Since with such a device according to the present invention the coffee and the water are fed into a mixing device in substantial vertical direction, hardly any turbulences will occur in the container so that the ground coffee will come to float on the hot water.

As the piston travels upward, all the water will be pressed through the layer of ground coffee forming up against the filter, so all the water has the opportunity to come into contact with all the ground coffee. Coffee prepared with this device therefore has the correct strength and will taste good.

By allowing the water to come into contact with the ground coffee before conveying it into the container, the contact-time between water and coffee is prolonged so that the coffee extracts better.

The current invention will subsequently be elucidated with reference to embodiments shown in the annexed drawings. In the drawings.

Figure 1:
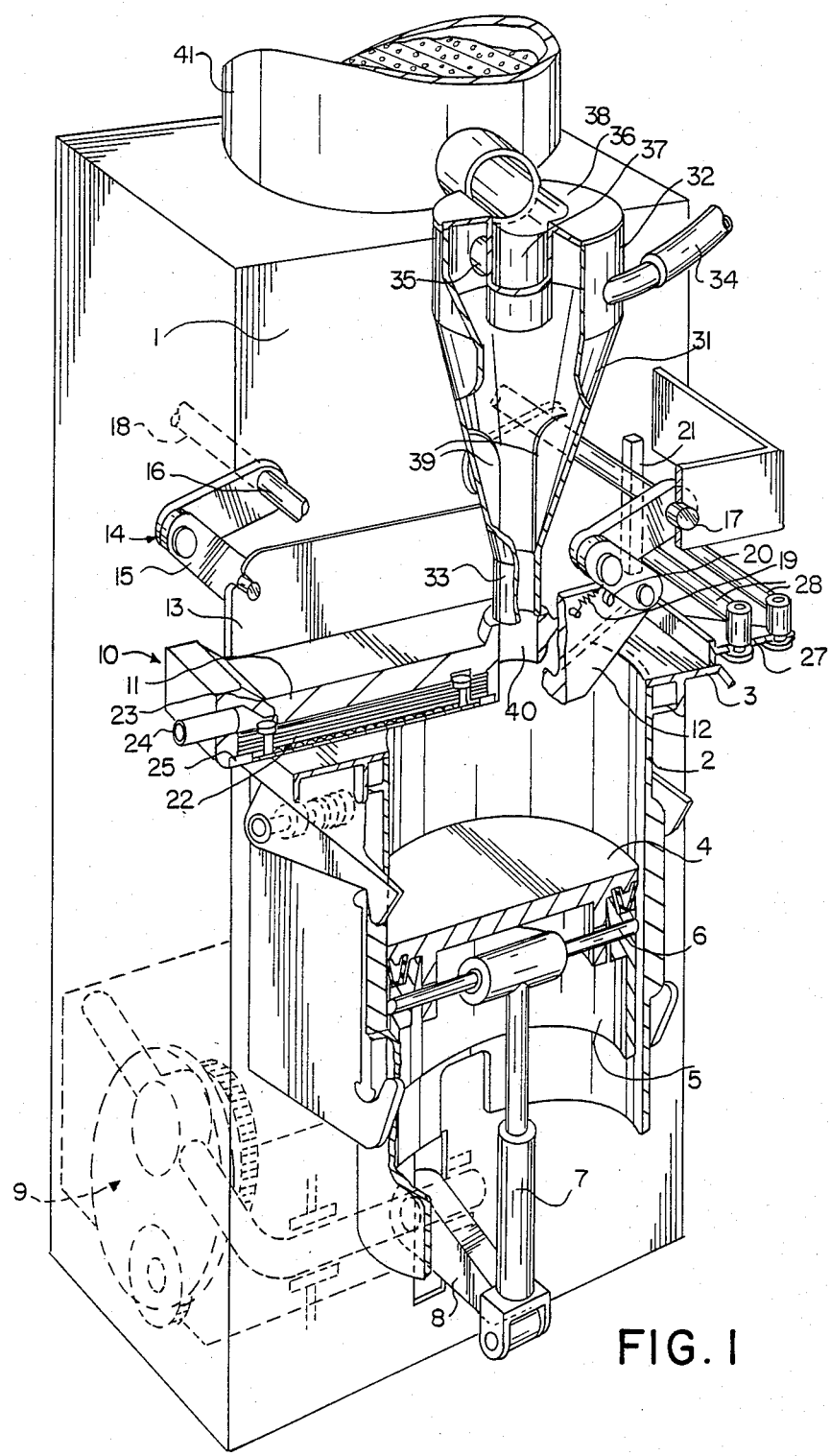
FIG. 1 shows a perspective view partially broken away of a first embodiment of the present invention.

The device for the preparation of coffee as shown in FIG. 1 comprises a frame 1 to the front side of which is attached a container 2, above which a container top plate 3 is arranged. Container 2 is closed off on the underside by a piston 4 provided with a piston wall 5 and a piston shaft 6, to which a piston rod 7 is attached. Piston rod 7 is connected with a lever 8 which is driven by means of a drive mechanism 9, shown with dashed lines, arranged in frame 1 to bring about up and downward movement of piston 4.

Figure 2:
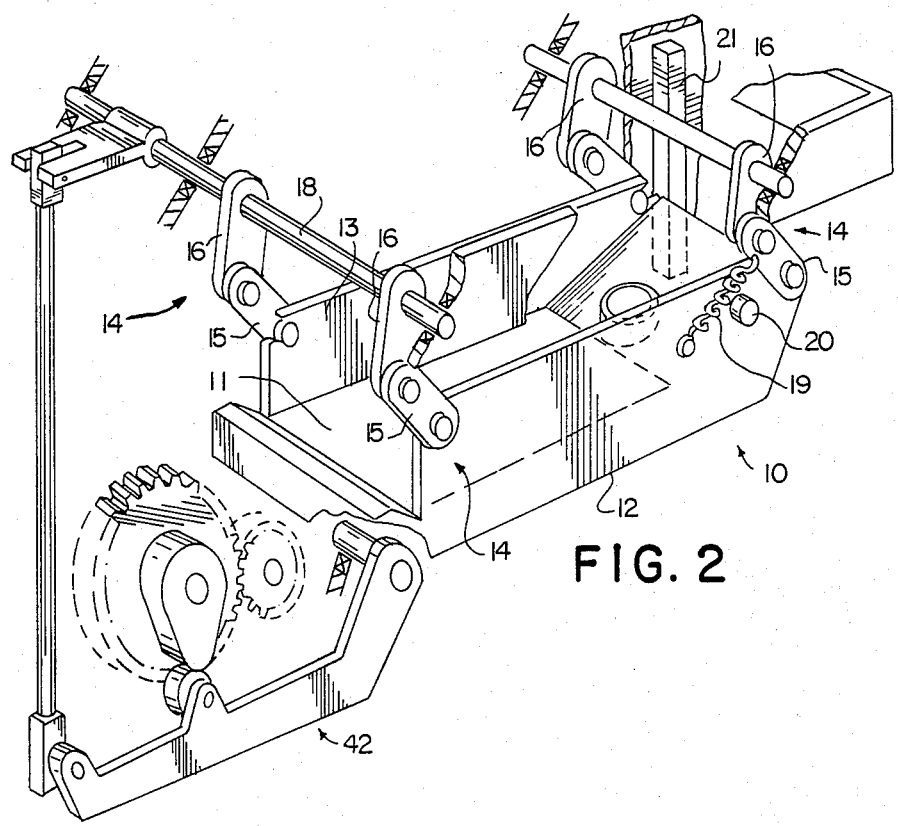
FIG. 2 shows a perspective view partially broken away of the filter holder and the associated drive mechanism used in the first embodiment of the present invention.

Arranged above container 2 is a filter body 10 shown schematically in FIG. 2. This filter body 10 comprises a filter holder 11, a front plate 12 and a rear plate 13. Each of the plates 12, 13 is provided at its top with two holes, to each of which is attached a hinge mechanism 14. Each of the hinge mechanisms 14 consists of two arms 15, 16, each connected to each other at one end for pivoting, and connected at the other end respectively to one of the plates 12, 13, and to one of the shafts 17, 18 attached to frame 1. A pair of the arms 16 is firmly connected to shaft 18. Arranged between one of the lower arms 15 and front plate 12 is a draw spring 19. Also arranged on plate 12 is a projection 20, whereby draw spring 19 forces arm 15 against projection 20 when the filter body 10 is located in its uppermost position.

Also arranged in filter body 10 next to filter 22 is a passage opening 40. This opening serves to let the mixture of ground coffee and water pass when the filter is situated in the uppermost position.

In order to move filter body 10 onto container 2, shaft 18 is driven by means of a drive member 42, so that the two arms 16 turn in an anti-clockwise direction. As a result the entire filter body 10 is moved in the corresponding direction whereby draw spring 19 forces arm 15 against projection 20. This movement continues until rear plate 13 strikes against a rib 21 attached to frame 1. This rib 21 prevents rear plate 13, and thereby the entire filter body 10, moving in sideways direction, so that after running up against rib 21, filter body 10 is only moved downward, whereby, counter to the tractive force of draw spring 19, arm 15 is moved away from projection 20. In this way is achieved that the filter body 10 approaches container 2 directly from above.

Filter holder 11 comprises a filter 22 arranged therein and a liquid collecting chamber 23 connected to an outflow pipe 24. Further a packing ring 25 is arranged around filter 22.

When a cup of coffee has just been made and the piston 4 is in its upper position, a layer of coffee grounds will be located between piston 4 and filter 22. This layer of coffee grounds must of course be removed.

Figure 4:
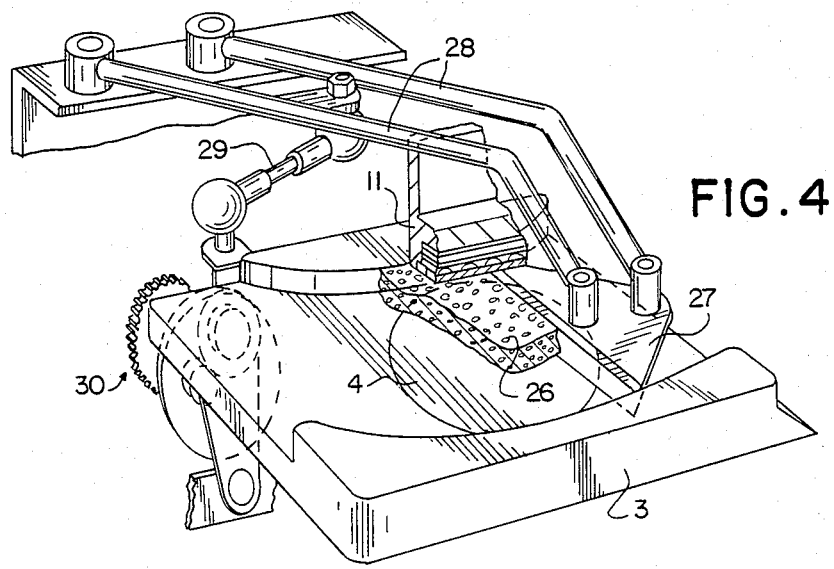
FIG. 4 shows a perspective view partially broken away of the cleaning member for the filter employed in this embodiment.

Provided for this purpose is a slide 27 which is further shown in FIG. 4 and which is connected to frame 1 by means of a pair of rods 28. These rods 28 form a parallelogram mechanism which is driven by a drive mechanism 30 by means of a rod 29. When driven by drive mechanism 30, slide 27 performs a movement over container upper plate 3 such that the quantity of coffee grounds present on the upper side of the piston is wiped off it and drops to the side of the upper plate of the container.

Above container 2 a funnel 30 shown perspectively in FIG. 1 is firmly attached to frame 1. Funnel 30 comprises a conical part 31, a cylindrical part 32 arranged above it and an outflow pipe 33 placed beneath the conical part. The angle of slope of the conical part preferably amounts to approximately 30 degrees, the diameter of the outflow opening is preferably 8 mm, while the angle of slope of the outflow pipe amounts to approximately 2 degrees. Running out into the cylindrical part 32 of the funnel is a water feed pipe 34 and also connected is a pipe 35 for the discharge of steam. Water feed pipe 34 runs out into cylindrical part 32 such that the water will perform a swirling movement. Placed on the top of cylindrical part 32 is a cover 36 provided with a feed tube 37 for the supply of ground coffee which is arranged concentrically in relation to the funnel. Cover 36 is also provided with a channel 38 running out into feed tube 37 for the supply of coffee.

Figure 3:
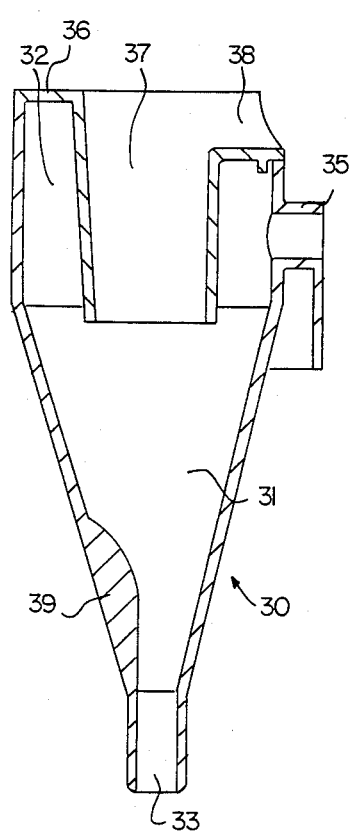
FIG. 3 is a sectional view of the funnel applied in this embodiment.

FIG. 3 shows a section of funnel 30 which shows that the funnel is provided with a partition 39 arranged in the interior of conical part 31 of funnel 36 and extending in vertical direction. It is of course possible to provide the funnel with a larger number of partitions 39. The partition is formed such that the inner edge of the partition extends flush with the inner wall of the outflow pipe. The partition is rounded off at the top. When the water flows through the funnel 30, the partition suppresses the swirling of the water, so that the water as well as the ground coffee supplied from above travel through outflow pipe 33 into container 2 without any turbulence. As a result, the ground coffee will float on top of the water when the water and the coffee are located in container 2.

Figure 5:
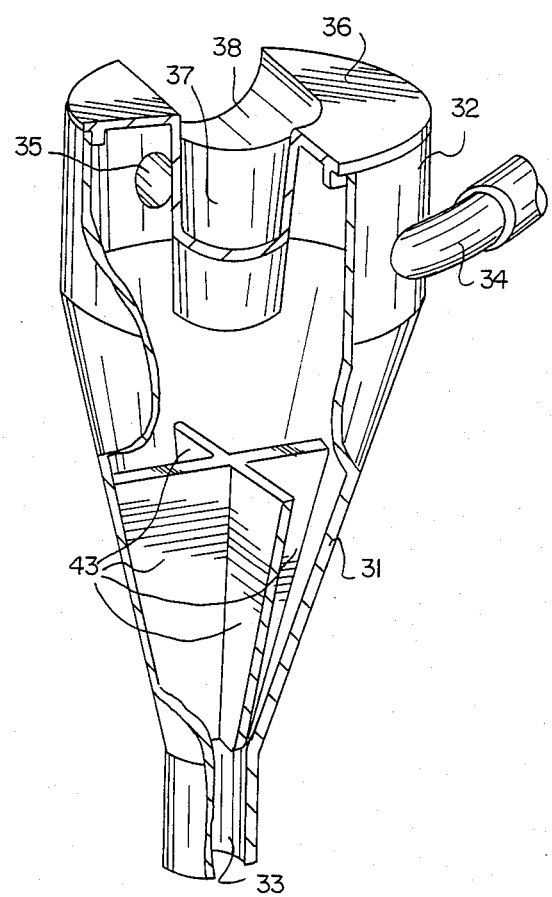
FIG. 5 is a perspective view of a preferred embodiment of a funnel according to the present invention.

In the case of the funnel as shown in FIG. 5, two partitions 43 are arranged in its conical part. These partitions 43 also serve to suppress the swirling of the water that is flowing through.

The working of the device according to the current invention will now be described with reference to the figures 6a–6f.

Figure 6A:
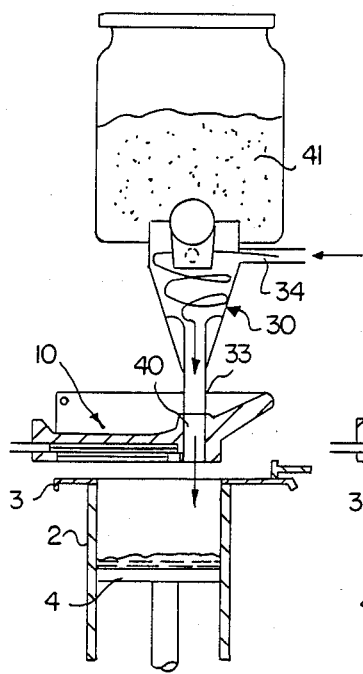
FIG. 6a–6f show schematic sectional views of the device according to the present invention during the various stages of preparation of the coffee.
Figure 6B:
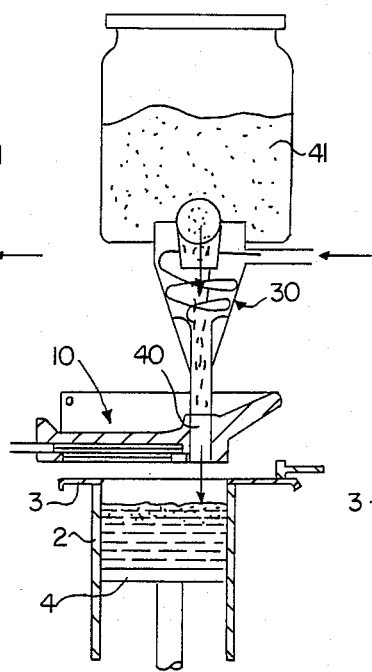

The piston 4 is, as shown in FIG. 6a, initially located in the lower position. Filter body 10 is at this point situated in its uppermost position. A quantity of water is then supplied by water feed pipe 4 which falls into funnel 30 and drops through outflow pipe 33 into container 2. The water thereby drops through opening 40 arranged in filter body 10. This opening is dimensioned such that the drop of the water and of the ground coffee is not disturbed. After a small quantity of water has been conveyed into container 2, whereby as a result of the debouchment of water feed conduit line 34 the water will begin to swirl in the cylindrical part 32 of the funnel, a quantity of ground coffee is carried out of coffee storage container 41, the trough-like channel 38 and feed pipe 37 for coffee into the funnel 30, whereby the supply of water remains continuous. As a result of the turbulence of the water, a close contact between water and coffee will occur so that extraction is improved. The mixture of water and ground coffee thus resulting flows along partitions 43, which causes the turbulences to be suppressed, and moves further through outflow pipe 33 and through opening 40 into filter body 10 into container 2. During the passage of the water through filter 30, the turbulences are suppressed by partitions 39, so that the mixture of water and ground coffee is carried perpendicularly into container 2. Because of the absence of turbulence the ground coffee will come to float on top of the water. This is shown in FIG. 6b. After the supply of ground coffee has been stopped the supply of water is continued for a further time to wash out of the funnel any ground coffee that may have been left behind.

Figure 6C:
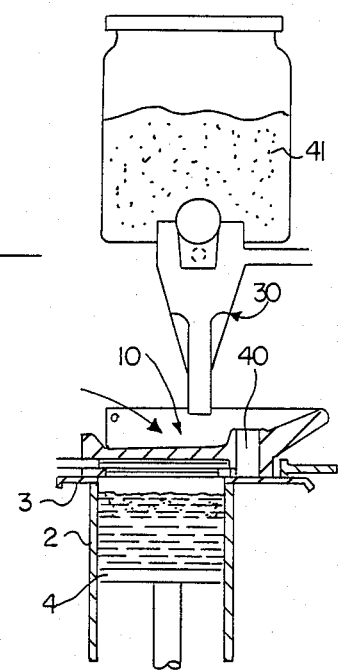

When the supply of water and ground coffee is completed, filter body 10 is moved above container 2, as shown in FIG. 6c.

Figure 6D:
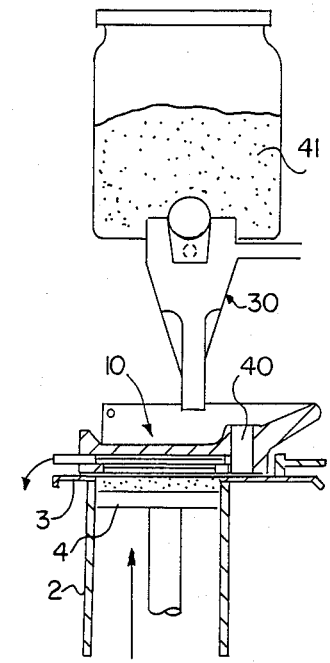
Figure 6E:
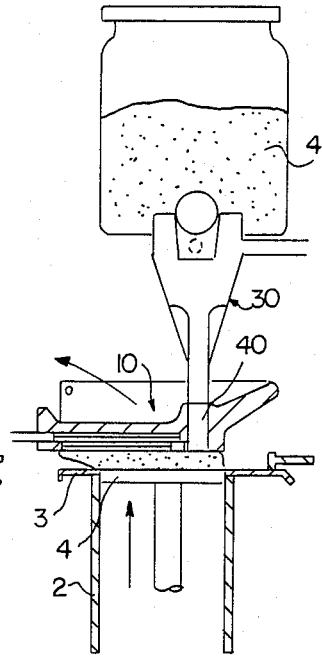
Figure 6F:
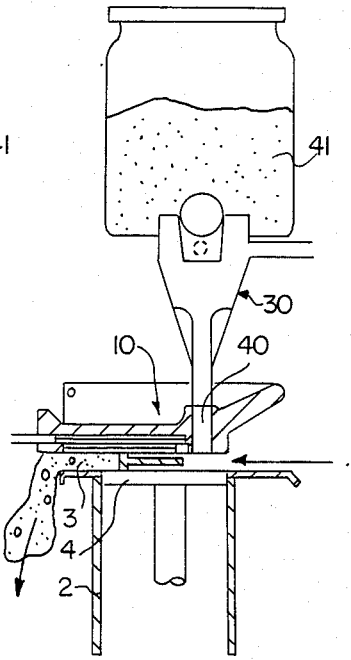

The piston 4 will subsequently be moved upward and the water present in container 2 will be pressed through the layer of coffee forming up against the filter and through the filter into collecting chamber 23, and from there into outflow pipe 24. A quantity of coffee grounds will then remain in the container, as shown in FIG. 6d. The movement of piston 4 continues however, until the upper face of this piston is located in the plane of container holder 3, as shown in FIG. 6e. The filter body 10 is hereby moved upward by the coffee grounds. The slide 26 will then move through between the upper side of the piston and the underside of the filter to shift away the coffee grounds present there, as shown in FIG. 6f. When this operation is completed, the piston and slide 26 return to their starting position and the cycle can start again.

Figure 7:
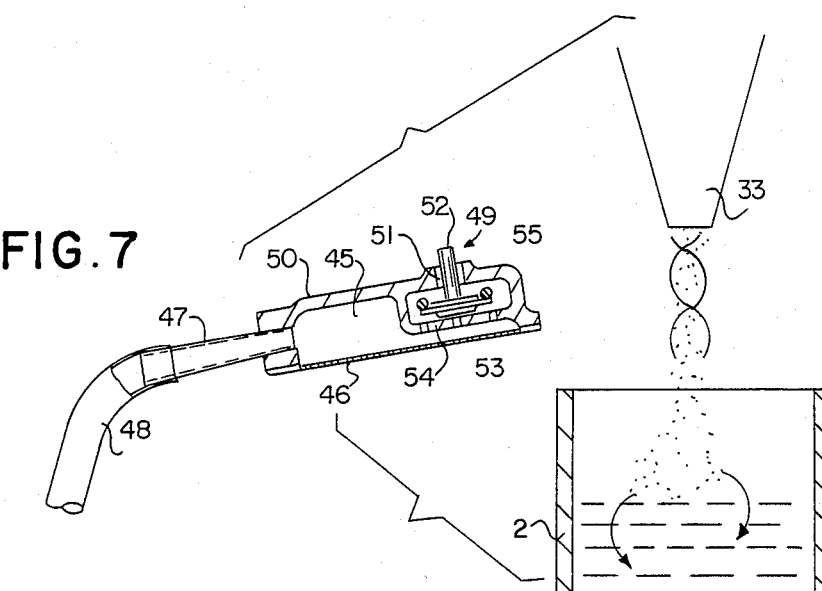
FIG. 7 is a schematic cross-sectional view of a second embodiment of the invention during the filling of the container.
Figure 8:
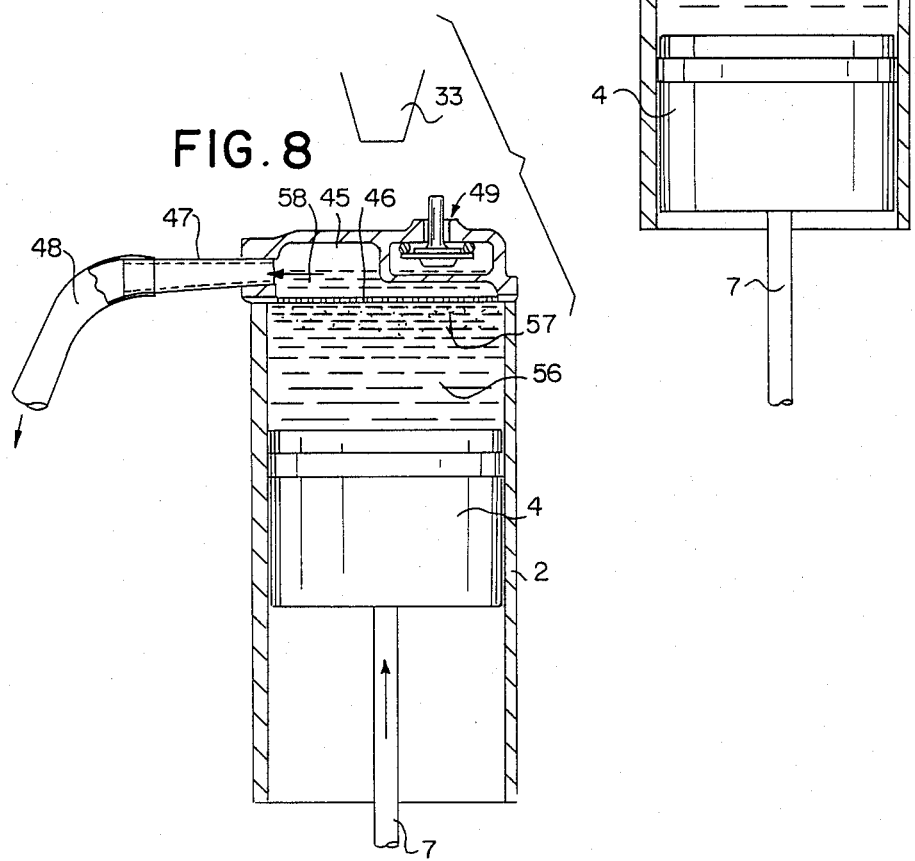
FIG. 8 shows the embodiment depicted in FIG. 7 during the upward movement of the piston.
Figure 9:
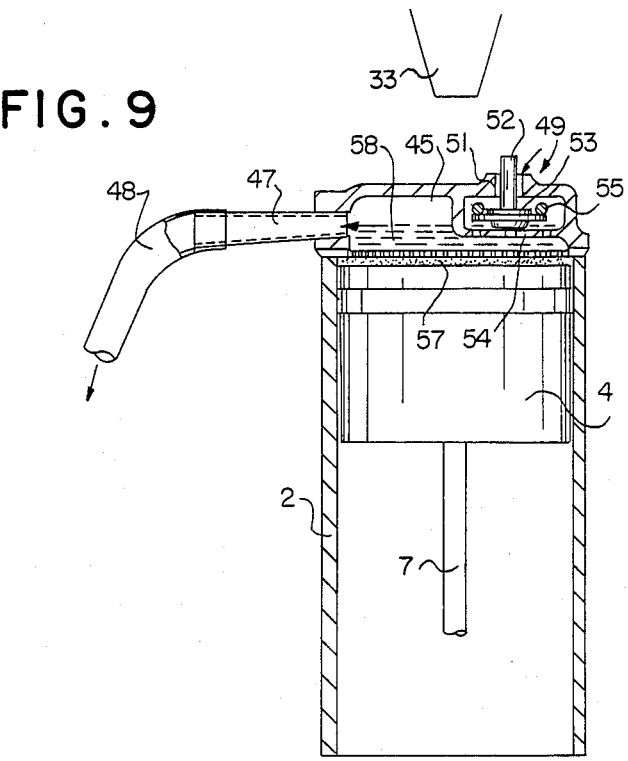
FIG. 9 shows the embodiment depicted in FIG. 7 during the siphon action of the outflow pipe.

In FIGS. 7, 8 and 9 another embodiment of the present invention is depicted, which aims to solve the problem as described below:

According to the first embodiment of the present invention the water present in the container is pressed through the layer of coffee grounds developing against the filter and through the filter during the upward movement of the piston. The coffee (drink) thus produced is being drained through a pipe and being supplied to a cup. The output opening of this drain has to be below the level of the container to obtain a siphon action so that the coffee is drained to its full extend and the residue of coffee grounds leaving behind is as dry as possible.

In practice this appears to present problems as often liquid is remaining in the space above the filter, which liquid moistens the coffee grounds being present below the filter, so that these can be disposed of only with difficulty during the next step. Also not all prepared coffee (drink) is conveyed to the cup.

According to this second embodiment a valve is provided in one wall of the chamber, which valve connects the chamber with the surroundings, and which closes when the pressure being present in the chamber is higher than the pressure of the surroundings, and which valve is open otherwise.

By these measures the valve is kept in its closed position during the upward movement of the piston so that the liquid pressed through the coffee grounds and the filter is drained fully through the pipe. When the piston has reached its upper position the pressure in the chamber will be lowered, as caused by the siphon action of the pipe, so that the valve opens and the liquid remaining in the chamber is disposed of as much as possible. The opened valve takes care of the supply of the volume of air, which had been taken in by the liquid.

Subsequently this will be illucidated. Apart from the parts already described together with the first embodiment, the second embodiment comprises a collection chamber 45, at the lower end of which a filter 46 is provided. This chamber 45 has been provided movably, so that this chamber can be moved from the position depicted in FIG. 7 during the supply of coffee and water to a position, as depicted in FIG. 8, wherein the water is pressed through the filter 46 into the chamber 45. The driving means required hereto have not been depicted in the drawings. By means of a pipe 47 is the chamber 45 connected with a outflow hose 48.

The chamber also comprises a valve 49. This valve has been provided in the upper wall 50 of the chamber, which comprises a substantially clindrical guide element 51. A stem 52 stretches through the opening of the guide element 51. To the lower end of the stem 52 a plate 53 has been provided, which is substantially perpendicular to the direction of the stem 52. This saucer, together with the stem 52 connected thereto, has been located such, that the stroke thereof is being limited by a perforated wall 54 provided at the lower end thereof. On its top the plate 53 comprises an annular ring 55.

Otherwise this second embodiment differs from the first embodiment by the lack of a passage opening in the chamber 5. In the case of this embodiment the hinge system will differ in so far that during the filling of the container the jet emanating from the funnel 33 passes the chamber 5.

Subsequently the action of this embodiment will be described.

In the situation shown in FIG. 7 the chamber 44 is located next to the top of the container 1. From the outflow pipe 33 located above the container 2 a mixture of heated water 56 and coffee grounds 58 flow into the container 2, which is closed to its lower side by the piston 4.

Subsequently the chamber 45 is moved until on top of the container 2 by means of conveying means not depicted in the drawings. The resulting situation has been depicted in FIG. 8. Afterwards the piston 4 moves upwards, pressing the water 56 through the layer of coffee grounds 57 developing against the filter 46 into the chamber 45. The liquid (coffee) collecting in the chamber 45 then drains off through the pipe 47 and the outflow hose 48 until in a cup not depicted. As a result of the pressing action of the piston 4 the valve 49 is closed.

When the piston 4 has reached its upper position, as is depicted in FIG. 9, the pressure prevailing in the chamber 45 will be equal to the pressure prevailing in the surroundings as a consequence of the deletion of the pressure in the chamber 45 and the draining of the coffee liquid 58. Then the valve 49 will open, so that air can flow between the stem 52 and the guide element 51 through the perforations in the perforated wall 54, so that the amount of coffee 58 remained in the chamber 54 can also drain through the pipe 47 and the hose 48. Thus the coffee grounds 47 will be dry as these will not be moistured by a rest of coffee left behind in the chamber 45.

Subsequently the chamber 45 is moved to its initial position and the dry coffee grounds are wiped off from the top of the piston 54 by means of a wiper 27, after which the cycle can start again.

I claim:

1. Device for preparing coffee comprising:
   a cylindrical container having an open top and a vertically reciprocable piston forming the underside of the container,
   a filter and means for moving the filter between a position closing the open top of said container to allow brewed coffee to be expelled therethrough and a position exposing the container to the introduction of ground coffee and hot water,
   and supply means for supplying ground coffee and hot water into the open top of the container in substantial vertical direction only so that hardly any turbulence will occur in the container and the ground coffee will come to float on the hot water, the supply means being equipped to mix coffee and water.

2. Device as claimed in claim 1 characterized in that the supply means are provided with means for suppressing the turbulence of ground coffee and water during the outflow.

3. Device as claimed in claim 2 characterized in that the supply means are formed by a funnel arranged above the container with an outflow pipe directed vertically downward.

4. Device as claimed in claim 3 characterized in that the funnel is provided with at least one internal partition extending in radial direction.

5. Device as claimed in claim 3 characterized in that the funnel is provided with two partitions extending at right angles to each other and across the whole diameter of the funnel.

6. Device as claimed in claim 3 characterized in that the funnel is provided with at least one partition extending from the funnel wall toward the interior, which partition extends over only a part of the radius.

7. Device as claimed in claim 6 characterized in that the partition extends inward as far as the produced part of the line of the outflow pipe.

8. Device as claimed in claim 7 characterized in that a feed pipe for ground coffee extends from above into the funnel and that the internal diameter of the outflow opening of said feed pipe is equal to the internal diameter of said funnel at the point of the upper wall of the at least one partition.

9. Device as claimed in claim 8 characterized in that the funnel is circular symmetrical, that the angle of slope of the conical wall amounts to approximately 30 degrees, that the outflow pipe is conical, the wall has an angle of slope of 2 degrees and that the diameter of the outflow opening amounts to approximately 8 mm.

10. Device as claimed in claim 9 characterized in that at a level lying below the outflow opening of the coffee, a water feed pipe runs out into the funnel.

11. Device as claimed in claim 10 characterized in that the water feed pipe extends tangentially relative to the funnel.

12. Device as claimed in claim 11 characterized in that the axial line of the funnel extends at some distance from the axial line of the container.

13. Device as claimed in claim 12 characterized in that the axial line of the funnel extends at a distance of approximately 14 mm from the axial line of the container.

14. Device as claimed in claim 13 characterized in that a filter member is disposed between the container and the funnel, which filter member can be moved into two positions and which is provided with an opening, that in the upper position of the filter member the opening is located beneath the outflow pipe, that the diameter of the opening is greater than the opening of the outflow opening, and that the filter member is movable until to and from the upper rim of the container in substantially the vertical direction.

15. Apparatus to claim 14 characterized in that the filter is a part of a chamber positionable on top of the container, which chamber comprises a drain channel directed downwards, characterized by a valve, provided in one wall of the chamber, which valve connects the chamber with the surroundings and which valve closes when the pressure prevailing in the chamber is higher than the pressure prevailing in the surroundings and which is opened otherwise.

16. Apparatus according to claim 15 characterized in that the valve is a mechanical valve.

17. Apparatus according to claim 16 characterized in that the valve has been arranged in an upper wall, extending substantially horizontally of the chamber, that the valve is a substantially horizontally plate and a stem fixed thereto, which plate is movable substantially in vertical direction along the upper wall of the chamber and a perforated wall provided thereunder, in which the stem is being guided in a guide element, fixately connected with the upper wall of the chamber.

18. Apparatus according to claim 17 characterized in that a seal of a flexible material is provided between the plate and the upper wall of the chamber.

19. Apparatus according to claim 18 characterized in that the plate is provided of a thickening adapted to its lower side.

20. A device for brewing a volume of coffee for consumption which comprises the combination of:

a container having an open top and a piston movable between a first position forming a movable bottom for the container to define a receiving space and a second position substantially at the top of the container, means for moving the piston between the first and second positions thereof, filter means for passing brewed coffee upwardly out of the container while retaining coffee grounds therein, and supply means for flowing a quantity of hot water downwardly through the open top of the receiving space to form successive turbulent and non-turbulent regions of water flow and for introducing ground coffee into the turbulent hot water flow region so that the hot water and ground coffee are admixed in the turbulent flow region whereafter the ground coffee tends to float in the hot water in the non-turbulent region and continues to float and rise to the surface of the hot water/ground coffee admixture which fills the receiving space.

21. A device as defined in claim 20 wherein the supply means comprises a funnel having an upper conical portion for swirling hot water passing therethrough to create turbulence and a lower conical portion having partition means for suppressing the swirling and means for introducing ground coffee into the swirling hot water.

22. A device as defined in claim 21 wherein the means for introducing ground coffee discharges the ground coffee downwardly into the lower conical portion.

* * * * *